United States Patent
Hinderling et al.

(10) Patent No.: US 12,455,406 B2
(45) Date of Patent: Oct. 28, 2025

(54) TARGET OBJECT WITH IMPROVED ANGULAR INCIDENCE RANGE FOR RETROREFLECTION

(71) Applicant: HEXAGON TECHNOLOGY CENTER GMBH, Heerbrugg (CH)

(72) Inventors: Jürg Hinderling, Marbach (CH); Thomas Piok, Koblach (AT)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 487 days.

(21) Appl. No.: 17/954,268

(22) Filed: Sep. 27, 2022

(65) Prior Publication Data

US 2023/0102020 A1   Mar. 30, 2023

(30) Foreign Application Priority Data

Sep. 28, 2021 (EP) .................................. 21199619

(51) Int. Cl.
  *G02B 5/136*   (2006.01)
  *G01C 15/06*   (2006.01)
  (Continued)

(52) U.S. Cl.
  CPC ............ *G02B 5/136* (2013.01); *G01C 15/06* (2013.01); *G02B 7/1805* (2013.01); *G02B 27/0006* (2013.01)

(58) Field of Classification Search
  CPC .. G02B 5/136; G02B 7/1805; G02B 27/0006; G02B 5/12; G02B 5/04; G01C 15/06
  (Continued)

(56) References Cited

U.S. PATENT DOCUMENTS

| | | | |
|---|---|---|---|
| 3,865,467 A * | 2/1975 | Von Thuna | G01V 7/14 73/382 R |
| 6,123,427 A | 9/2000 | Hinderling | |

(Continued)

FOREIGN PATENT DOCUMENTS

| | | |
|---|---|---|
| CN | 101198839 A | 6/2008 |
| DE | 10209 895 A1 | 9/2002 |

(Continued)

OTHER PUBLICATIONS

Extended European Search Report dated Apr. 5, 2022 as received in Application No. 21199619.4.

(Continued)

*Primary Examiner* — Ricky D Shafer
(74) *Attorney, Agent, or Firm* — Maschoff Brennan

(57) ABSTRACT

A target object providing a large angular incidence range for retroreflection and a reduced amount of interfering reflections. The target object is configured to provide a 360° all-around retroreflection about a vertical axis and ±45° angular incidence range from the horizontal. According to one aspect, the target object comprises eight triple prisms arranged around the arrangement axis in such a way that their contour embeds in an octahedral shape, wherein four of the eight triple prisms are arranged to embed in a first pyramidal body and other four of the eight triple prisms are arranged to embed in a second pyramidal body. Each of the first and the second pyramidal bodies comprises a pyramid base and four lateral surfaces, wherein the pyramid bases of the first and the second pyramidal bodies are arranged parallel to each other.

19 Claims, 8 Drawing Sheets

(51) Int. Cl.
*G02B 7/18* (2021.01)
*G02B 27/00* (2006.01)

(58) Field of Classification Search
USPC .................................. 359/509, 834; 33/290
See application file for complete search history.

(56) References Cited

U.S. PATENT DOCUMENTS

| | | | | |
|---|---|---|---|---|
| 6,185,055 | B1* | 2/2001 | Feist | G02B 5/122 |
| | | | | 359/834 |
| 9,846,035 | B2* | 12/2017 | Kotzur | G01C 15/02 |
| 2002/0144416 | A1 | 10/2002 | Ghesla | |
| 2008/0229592 | A1* | 9/2008 | Hinderling | G01C 15/06 |
| | | | | 359/834 |
| 2009/0260240 | A1 | 10/2009 | Bernhard et al. | |
| 2013/0329218 | A1 | 12/2013 | Vogel | |
| 2020/0408520 | A1* | 12/2020 | Jensen | G01C 15/002 |

FOREIGN PATENT DOCUMENTS

| | | |
|---|---|---|
| EP | 0 846 278 A1 | 6/1998 |
| JP | 2009-204557 A | 9/2009 |
| JP | 2012-122800 A | 6/2012 |
| WO | 2020/255615 A1 | 12/2020 |

OTHER PUBLICATIONS

CN Office Action dated Jun. 13, 2025 as received in Application No. 202211126044.X.

* cited by examiner

TARGET OBJECT WITH IMPROVED ANGULAR INCIDENCE RANGE FOR RETROREFLECTION

BACKGROUND

The present disclosure relates to a target object, in particular for geodetic, construction or industrial surveying, wherein the target object provides a large angular incidence range for retroreflection and a reduced amount of interfering reflections.

By way of example, in geodetic surveying the position measurement of a target point to be measured or staked-out happens indirectly, e.g. wherein a target object on a surveying pole, e.g. provided by a retroreflector such as a triple prism, a reflective foil or spherical reflector, is measured by a coordinate measuring device, e.g. by using a total station or a tachymeter. Since a tip of the surveying pole is placed on the actual target point in the terrain, the position of this target point can be derived due to a determinable spatial relationship between the target object and the tip of the pole. This approach particularly allows to measure and record or stake-out a point that could not be measured or staked-out directly due to an obstacle between the coordinate measuring device and the point.

Current practice is to ensure the pole is perfectly vertical over the point of interest and compensate the position for the length of the pole. Levelling the pole, however, takes time and it would be desirable to take measurements of the target position without the need to level the pole.

Surveying instruments such as theodolites, automatic total stations (total positioning systems, TPS), laser trackers, automatic alignment devices, distance measuring devices, but also laser scanners have been used for decades to measure both natural objects and target marking devices. For example, the horizontal distance, the height difference, the direction angles or the relative coordinates between the measuring device and the target object are measured.

The targeting is performed either manually with the use of a visual targeting device or completely automatically by means of an electro-optical sensor, for example with a quadrant diode or an image camera.

Surveying instruments have at least one light emitter that emits radiation along a target axis of the instrument in the direction of the reflecting target object. The surveying instrument includes an optical arrangement (automatic target recognition, ATR) to receive the retro-reflected radiation. Based on the reflected light, the instrument automatically aligns itself with the target object. This targeting should be as accurate as possible towards an optically marked and calibrated center on the reflector unit. Angular measurements of the instrument with respect to the alignment on the target object are made in two dimensions, in the horizontal and vertical directions. Furthermore, a distance measuring unit (LiDAR) determines the oblique distance between the surveying instrument and the target object. This determines the spatial coordinate of the target object relative to the instrument.

Surveying instruments are optionally equipped with a target search unit (so-called powersearch functionality). These sensors also require a sufficiently good reflector arrangement, especially at long distances of 500 m or 1000 m, to generate a sufficiently high reflective signal.

By way of example, the target marking devices are configured as a hand-held pole equipped with a reflector unit and a bubble level. Alternatively or in addition, a GNSS or GPS antenna and/or a target identification unit is attached to the upper pole end of the pole (so-called smart pole).

If the poles are moved (also without GPS antenna), for example by carrying or attachment to a moving vehicle, they can be tracked with a surveying instrument such as a total station. During the tracking process, the surveying instrument is continuously aligned with the reflective element on the target unit and follows the path by means of motorized alignment units in horizontal and vertical orientation. The complete measurement system consists of the combination of the robotic total station and the pole unit, whereas the user is located at the pole (also called rover).

The pole is typically not used to determine the coordinate of the center of the reflector, but the coordinate of a point connected to the reflector. Such a point can be the foot point of the pole or the bucket of a construction vehicle. There is therefore a lever arm between the measurement point and the center of the reflector, through which measurement errors can creep in when determining the coordinates of the point.

Solutions of the prior art typically have disadvantages with regard to oblique light incidences, e.g. wherein retroreflection is limited within a vertical measuring range ±30° from perpendicular incidence. Other problems are interfering reflections without reference to the reflector center and without fixed location reference. Such reflections complicate the automatic alignment to the reflector center, losing the target object at the worst case.

Often, solutions of the prior art are optimized for a perpendicular installation of the pole, wherein the accuracy is reduced with an oblique installation. By rotation around the yaw angle, the reflection center of the reflector setup varies in the lateral, for example in the horizontal and vertical direction. The measurement accuracy is reduced to typically 5 to 10 mm.

The arrangement of the reflected light beams is divided, which makes accurate automatic targeting difficult. With a rotation around the yaw angle, the signal strength for the distance measurement and for the automatic targeting also varies.

The entrance area of the retroreflectors usable for retroreflection is only a fraction of the total light entry surface. For example, the edges are not effective if the entry surfaces are well aligned towards the measuring instrument. However when the reflectors are tilted to the line of sight, then the aperture for the reflected beam is reduced. The prisms therefore need a certain size which is manifested in a higher weight.

Applications with a tilted pole and thus also a tilted reflector arrangement have typically not been an issue so far. The most common using position of previous target objects is the vertical setup using a plummet or an IMU with simultaneous targeting with the targeting beam of the automatic target recognition (ATR) of a laser tracker or a total station to determine the horizontal and vertical direction of the reflector center and thus indirectly also the foot point on the pole.

In order to simplify the measuring process for the surveyor, a new reflector arrangement should provide the measuring accuracy reached for vertical setup also for an oblique setup of the pole. Known 360° reflector arrangements have the disadvantage of not being able to mark the target point with sufficient accuracy, in particular the accuracy of the direction determination is not sufficient depending on the orientation of the pole and thus of the reflector device. It is therefore the object of the present disclosure to provide a target object which enables more accurate and less expensive spatial detection of target points.

With a conventional GNSS RTK rover, the survey is slow and includes several steps. The pole is typically required to be held vertically for each measurement while simultaneously reading the measurement data on the controller screen and moving the pole to the correct position. The position of the reflector or the GPS antenna attached on a 1.8 m or 2 m pole is calculated. In order to obtain correct measurement data shown on the screen, i.e. to show the position of the pole tip, the pole must be held vertically.

Recently, modern poles have emerged where the position of use no longer has to be exclusively vertical. For the exact determination or indication of the foot tip of a pole or rover (pole with GNSS unit), the pole can also be held oblique during the measurement. A vertical setup of the target object and thus of the reflector unit should ensure the previous coordinate measurement accuracy in such a skewed setup.

By way of example, inclination compensation between the pole tip and the foot of the pole is carried out by using a special IMU sensor technology, e.g. wherein IMU and GNSS data are combined or a visual inertial system which combines the data and processing of cameras, IMUs and optionally GNSS sensors. Such a visual inertial system solves the problem of the six degrees of freedom of a solid body in space by applying algorithms known from simultaneous localization and mapping (SLAM).

Spots such as building corners, walls, fences, light poles, or spots below obstacles such as cars can often not be measured directly with a vertical pole. For example, to survey a building corner, a spot nearby would have to be determined and a compensation survey would have to be performed with regard to that spot.

For various applications, it has proved to be advantageous to form target objects in such a way that they can be sighted and surveyed from more than only one direction, advantageously from all directions. Thus, the surveyor who carries the target object and erects it at different points need not ensure correct orientation relative to the measuring instrument each time he erects it. Furthermore, often the same fixed point is measured in surveying processes with changing instrument setups, the target objects positioned at the fixed points being sighted from different directions. In the construction of traffic routes—for example in the construction of road tunnels—measurements are carried out to one and the same measuring point or the target object, often from substantially opposite directions, reorientation of the target object in each case being undesired. A target object, which can be surveyed from a large angle range, in particular 360° in horizontal direction and more than ±45° in vertical direction, is also desirable for the surveying of moving objects.

Since modern poles do not need a vertical alignment, the angular orientation of the reflector to the line of sight can result in any value. So the new reflector shall have a large field of view in both directions azimuth and elevation.

The simplest case of such a target object is a target object having a spherical reflector which, however, is limited with respect to its potential uses since spherical reflectors can survey only over small distances. For measurements even at long distances, in general large sized retroreflecting reflective foils or triple prisms are used. Their substantially higher degrees of retroreflection permit distance measurements over hundreds or thousands of meters. In contrast to the spherical reflectors, however, they retroreflect optical beams only in a limited vertical direction range within a limited azimuthal alignment range of the triple prisms or of the reflective foils. Typically, optical beams in horizontal ranges of ±45° and vertical ranges of ±35° are retroreflected with high intensity. To obtain so-called 360° or all-around reflectors, target objects can be used which are composed of several retroreflectors EP 0 846 278 describes a 360° reflector having a plurality of triple prisms. The triple prisms are arranged in such a way that the lateral surfaces of adjacent triple prisms touch one another, with the result that, on passage of the retroreflection from one triple prism to the adjacent triple prism, the pupils of the adjacent prisms at least partly touch. The arrangement thus acts as an all-round reflector which reflects light from all directions of incidence in an azimuthal plane (e.g. a horizontal plane in case of a vertical arrangement of the target/pole). FIG. 5 of that patent shows the all-round reflector in a holder. The all-round reflector is, however, less suitable for measurements at close range since the measurements are falsified over small distances owing to interfering or corrupted reflections.

DE 10209 895 describes an all-round reflector comprising an arrangement of eight triple prisms in the form of two pyramids which are directed with their base services towards one another. As a result of the special arrangement of the triple prisms, interfering reflections, in particular double reflections, in the horizontal angle range are reduced. However, in the case of large vertical angles deviating from the horizontal plane, interfering reflections are still present, which constitutes a significant troublesome factor particularly in the case of automated guidance and control of construction machines. Interfering reflections are generated not by triple reflections but any other periscopic like light paths where at specific orientations to beam is reflected back to the total station. In order to form a positionable target object, a holding part on which a plumbing staff can be mounted is arranged on the prism arrangement. The holding part is mounted from below directly on the prism arrangement, which leads to consider able forces acting on the fragile triple prisms, for example when the plumbing staff is set down roughly on a surface.

A disadvantage common to the described arrangements in the prior art is the occurrence of interfering reflections at vertical angles deviating from the horizontal plane, e.g. by more than ±30°. The interfering reflections are back reflections emitted by the reflector unit, but without reference to the marking center and without a fixed location reference. It is only the triple reflected beam which is anchored to the reflection center of the physical corner cube. Thus, reflections can occur that originate from prisms that are located laterally from the actual working prism and are not aligned in the direction of the measuring beam.

A further problem of arrangements from the prior art is their sensitivity with respect to damage to the reflecting elements, usually formed from glass, by external mechanical effects. The sensitivity is due in particular to the fact that the arrangements for all-round reflection of the radiation have to be formed with glass parts whose light entry surfaces cover a 360° azimuthal angle range, without external protective devices. For holding the glass parts, most arrangements have holding parts which are connected directly to the glass parts, with the result that the action of external forces is transmitted to the fragile glass parts especially to the mirror surfaces. The three mirror surfaces of the glass prisms are grinded and polished such that their mutual angles are orthogonal within a precision of sub-arcseconds to generate a retroreflected beam with a deviation smaller than typically 5 arcseconds to the incident beam. Furthermore, the flatness of each surface is in the micrometer or submicrometer range. External forces induced by holding parts or cementing glue degrade the flatness of the mirror surfaces which results in an angular spreading of the reflected beam and shortens the maximum measurement distance of the measuring instrument.

Since the target object is often used in such a way that it is setup and moved by a surveyor in the terrain, the target object should be hand-held and portable and therefore as light as possible. Holding devices, such as plumbing staffs, having a low weight are therefore usually used. The high weight of the reflector arrangement and the low weight of the plumbing staff result in an unbalanced target object which easily falls over, and the sensitive glass parts can easily break. This problem occurs to an even greater extent in the case of the more and more frequent design of a target object in which the reflector arrangement additionally carries a GPS. In the construction of traffic routes, where the target objects are mounted on construction machines, considerable forces also act on the target objects owing to vibrations, which leads to oscillations and in particular places considerable stress on the connection between holding part and reflector arrangement.

Another problem of the prior art is the occurrence of interfering reflections when the light entry surfaces of the triple prisms are wet. The water drops on the prism surfaces can be caused by rain, by snowfall or by splash water, among other things. The effective size of the aperture of the reflecting beam is reduced by the sum of all cross sections of the water droplets. At worst the residual free aperture can be reduced nearly down to zero.

SUMMARY

It is the object of the disclosure to provide an improved target object, which eliminates deficiencies of the prior art.

A particular object is to provide a target which provides retroreflection with high intensity for an angular range up to 360°, and which provides an increased range for oblique incidence.

These objects are achieved by realizing at least part of the features of the independent claims. Features which further develop aspects in an alternative or advantageous manner are described herein.

The disclosure relates to a target object, in particular for geodetic, construction and industrial surveying, having an arrangement of four triple prisms, each of the triple prisms having a light entry surface and three reflective surfaces. The four triple prisms are arranged around an arrangement axis in such a way that their (outer) contour can be embedded in a pyramidal body (e.g. wherein their contour can be fitted into a pyramidal body, matches a shape of a pyramidal body or forms a pyramidal body), which has a pyramid base and four lateral surfaces lying in different planes, wherein a common point of intersection of the planes forms a pyramid tip opposite the pyramid base (e.g. wherein the common intersection of the four lateral surfaces forms the pyramid tip).

For each of the four triple prisms one of its reflective surfaces is aligned parallel to the pyramid base and each of its other two reflective surfaces is aligned parallel to a reflective surface of a respective adjacent triple prism of the four triple prisms.

According to one aspect, the target object comprises a shading element, which is arranged axially (with respect to the arrangement axis) on side of the pyramid base (e.g. next to the pyramidal body), wherein, in a direction perpendicular to the arrangement axis, an opaque part of the shading element extends beyond a maximum extension of the four reflective surfaces aligned parallel to the pyramid base.

According to another aspect, the target object comprises an opaque blocking component arranged in an area around the pyramid tip, wherein the blocking component blocks light from passing the light entry surfaces of the triple prisms, thereby reducing the effectively available size of the light entry surface of each of the triple prisms.

Alternatively, instead that the target object has the opaque blocking component, each of the triple prisms is configured to have a further prism surface which is different from the light entry surface and the three reflective surfaces. The further prism surfaces are arranged opposite the pyramid base, particularly wherein the further prism surfaces are parallel to the pyramid base, which, for example, results that the contour of the four triple prisms has the shape of a truncated pyramid.

Another possible use for a shading element is an arrangement in which the target object comprises a first and a second retroreflector (e.g. wherein the first and the second retroreflector are configured as triple prisms), with the first and the second retroreflector being arranged axially adjacent to one another on an arrangement axis. The shading element is arranged axially between the first and the second retroreflector, wherein an opaque part of the shading element radially extends beyond a radial extension of both the first and the second retroreflector in a direction perpendicular to the arrangement axis. In the case of oblique light incidence with respect to the arrangement axis, one of the first and second retroreflector is at least partially shaded by the opaque part of the shading element.

By way of example, each of the triple prisms has a light entry surface and three reflective surfaces, oriented in each case at right angles to one another. The triple prisms are configured in such a way that the distance between the reflection center (for a triple reflected beam) and the triple prism apexes is not greater than 5 mm, especially not greater than 3 mm.

The target object is configured to provide retroreflection for a light incidence range of 360° around the arrangement axis, particularly for light incidence perpendicular to the arrangement axis, more particularly wherein the target object has four triple prisms.

In a further embodiment, the target object comprises eight triple prisms each of the triple prisms having a light entry surface and three reflective surfaces. The eight triple prisms are arranged around the arrangement axis in such a way that their contour can be embedded in an octahedral shape, wherein four of the eight triple prisms are arranged to embed in a first pyramidal body and other four of the eight triple prism are arranged to embed in a second pyramidal body. Each of the first and the second pyramidal bodies comprises a pyramid base and four lateral surfaces, wherein the pyramid bases of the first and the second pyramidal bodies are arranged parallel to each other.

The first pyramidal body is formed in such a way that one reflective surface of each of the four triple prisms that are embedded in the first pyramidal body is aligned parallel to the pyramid base and the respective other two reflective surfaces of each of the four triple prisms that are embedded in the first pyramidal body are arranged adjacent to reflective surfaces of neighboring triple prisms embedded in the first pyramidal body.

The second pyramidal body is formed in such a way that one reflective surface of each of the four triple prisms that are embedded in the second pyramidal body is aligned parallel to the pyramid base and the respective other two reflective surfaces of each of the four triple prisms that are embedded in the second pyramidal body are arranged adjacent to reflective surfaces of neighboring triple prisms embedded in the second pyramidal body.

In other words, four of each of the eight triple prisms that are embedded in one of the two pyramidal bodies efficiently reflect the light rays from angles of the upper hemisphere, and four of each of the eight prisms efficiently reflect the light rays from angles of the lower hemisphere, wherein the shading element is arranged axially between the first and second pyramidal body and ensures that, in the case of oblique light incidence with respect to the arrangement axis, one of the first and second pyramidal body is at least partially shaded by the shading element.

Each of the eight triple prisms has a triple prism apex formed by the common intersection of its three reflective surfaces, and the triple prism apices are arranged on the corresponding pyramid base of the first and the second pyramidal body, respectively.

In a further embodiment, the target object comprises an opaque blocking component arranged in an area around the pyramid tip of at least one of the first and the second pyramidal body. The blocking component blocks light from passing the light entry surfaces of the triple prisms of the at least one of the first and the second pyramidal body, thereby reducing the size of the light entry surface of each of the triple prisms of the at least one of the first and the second pyramidal body.

In a further embodiment, each of the triple prisms of at least one of the first and the second pyramidal body is configured to have a further prism surface which is different from the light entrance surface and the three reflective surfaces. The further prism surfaces are arranged in such a way that the further prism surfaces are arranged opposite the pyramid bases, in particular wherein the further prism surfaces are parallel to the pyramid bases, resulting the contour of the four triple prisms of the at least one of the first and the second pyramidal body in the shape of a truncated pyramid.

In a further embodiment, the shading element comprises markings arranged on the opaque part of the shading element which extends beyond the maximum extension of the four reflective surfaces aligned parallel to the pyramid base, wherein the markings provide a position indication for a reflection center of one of the triple prisms (for a triple reflected beam). For example, in case of eight triple prisms arranged as described above, the shading element is arranged axially between the pyramidal body and the further pyramidal body (e.g. next to the pyramidal body and the further pyramidal body on side of the pyramid bases).

In a further embodiment, the shading element comprises markings arranged on the opaque part of the shading element, wherein the markings provide a position indication for a reflection center of one of the retroreflectors.

In a further embodiment, the shading element (e.g. fully) encircles the arrangement axis, particularly wherein the opaque part of the shading element is embodied as plane annular surface.

In a further embodiment, the shading element, e.g. fully, encircles the arrangement axis. For example, the opaque part which radially extends beyond the radial extension of both the first and the second retroreflector is embodied as plane annular surface.

In a further embodiment, the target object comprises a support frame which comprises four, and if applicable eight, receptions, arranged around the arrangement axis in such a way that their (common outer) contour matches the pyramidal body, and if applicable the further pyramidal body. Each of the receptions is delimited by three mutually perpendicular planes. The support frame comprises clip mounts arranged at the corners of the pyramidal body and if applicable the further pyramidal body which are configured to hold the four triple prisms, and if applicable the four further triple prisms, in the receptions in a tension-free and fixed arrangement.

The three mutually perpendicular planes forming the support frame are configured as solid and preferably perforation less plates, in particular solid metal plates/sheets. Therefore, each of the receptions is delimited by three mutually perpendicular solid plates, in particular solid metal plates.

The support frame provides a high stability and rigidity. For example, support frame is manufactured out of a metal injection molded material or a fiber-reinforced material. The support frame of the target object is configured to dissipate forces along the pole from the bottom of the target object to the top of the target object and is therefore capable of robustly carrying for example a GNSS sensor.

Instead of using a clip mount, the prisms could be glued together or to the support frame. However, this may cause unwanted thermal and mechanical stress on the optics and destroying the wavefront of the reflected laser light, which is avoided by using a support frame having clip mounts as described above. Anyway, it is thinkable that wherein the two reflective surfaces of each of the four, and if applicable eight, triple prisms arranged adjacent to one of the reflective surfaces of another of the four, and if applicable eight, triple prisms are glued together. In this arrangement, each of the four and the further four triple prisms has a triple prism apex formed by the common intersection of its three reflective surfaces. The triple prism apices are arranged on the corresponding pyramid bases, in particular wherein the triple prism apices are arranged on the arrangement axis.

Thanks to using a support frame as described above, the target object does not require any direct mutual adhesion between the prisms, so that no opto-mechanical stress occurs. An easily processable glass type such as N-BK7 is sufficient as the material for the triple prisms without causing any interfering reflections.

For example, the target object further comprises an interface, located at one of the distal ends on the arrangement axis and configured for connecting the target object to a counterpart, in particular a surveyor's pole or a protective cap.

In a further embodiment, the target object comprises a protective cap arranged at one of the distal ends and configured for protecting the target object against axial impinging water drops. The protective cap comprises a drainage channel, e.g. wherein the protective cap has a truncated cone shape. A cross-section perpendicular to the arrangement axis narrows from the one of the distal ends to the other distal end and a maximum cross-section perpendicular to the arrangement axis is larger than a radial extension of the retroreflectors or the triple prisms.

In a further embodiment, the protective cap has air intake openings as well as air outlet openings. The air outlet openings are arranged from the one of the distal ends towards the other distal end, e.g. wherein the air outlet openings are configured to generate an airflow parallel to one of the light entry surfaces of the prisms. The target object further has pneumatic air nozzles, configured to generate air blasts onto the light entry surfaces.

In a further embodiment, the light entry surfaces are equipped with a hydrophobic optical coating.

In a further embodiment, the (e.g. upper) protective cap has an adapter for a GNSS antenna and/or a visual inertial system accessory.

In a further embodiment, the protective cap has an adapter for an automated target identificator.

In a further embodiment, the protective cap has a target identificator, configured to provide target object information regarding a prism type of the target object and/or a target ID. For example, the prism type indicates a so-called addition constant for the reflection centre, which has a value that differs from zero. Especially for compensation measurements it is important that the correct reflector type is known and that the correct optical specifications and compensation parameters are applied in the context of a measurement with a coordinate measuring machine. The target ID, which can be unique, is used to identify the target object within a set of multiple target objects. The target object information is provided by a defined optical property of the target identificator, for example a defined reflectivity pattern, a color coding, a polarization coding, and/or or by means of a transmitted signal to be detected by the total station.

As outlined above, when triple prisms are mentioned in association with embodiments, they are to be understood in the broadest sense as meaning differently formed bodies of transparent materials for the retroreflection of optical beams, which have a pupil cross section or aperture area of in principle any desired form, for example trapezoidal, triangular or hexagonal, for entry or exit of the beams into or out of the body and three flat reflection surfaces oriented in each case at right angles to one another with triple reflection of said beams.

The retroreflecting effect of a triple prism derives from that of a triple mirror, in which three mirror faces abut one another at a right angle in each case. If light falls into such a triple mirror, the light rays are reflected at all three mirror faces, the light rays emerging from the triple mirror extending in parallel and laterally offset relative to the incident light rays. The parallelity is within some arcseconds to achieve long distances of several kilometers. This retroreflection is possible within a specific range of incidence angle relative to the normal of the light entry surface.

Not all the light which falls through the light entry surface is also retroreflected. Only the light falling into the pupil of the triple prism can be retroreflected. The pupil is defined by the lateral edges of the light entry surface and by those (straight and kinked) lines which are produced by point reflection of the lateral edges of the light entry surface at the virtual prism vertex. The virtual prism vertex is the prism vertex which is visible on looking into the triple prism but, because of the refraction of the prism glass, is only apparent.

The largest pupil or aperture area, and thus the largest amount of light retroreflected results, for example, for a rotationally symmetrical triple prism in the case of the incidence of light perpendicular to the light entry surface of the triple prism.

In the case of changed angles of incidence of the light into the triple prism, the shape and size of the pupil change. With increasing incidence angle, the pupil surface becomes smaller and is situated more at the edges of the light entry surface. Finally, in the case of a specific incidence angle the areas vanish, and no more light is retroreflected.

An arrangement is also thinkable in which a plurality of triple prisms with triangular light entry surfaces are arranged in such a way that the side faces of neighboring triple prisms touch one another. In this case, the triple prisms can be of different size and have different angles of their light entry surfaces relative to the space diagonal through the triple prism vertex. This is useful for specific, prescribed angular ranges in the case of retroreflections.

When combining multiple triple prisms for a 360° target object it is also thinkable to ensure that upon transition of the retroreflection from one triple prism to the neighboring triple prism the pupils thereof touch along a relatively long path. Whereas with changing incidence angle the pupil area of one triple prism decreases, the pupil area of the neighboring triple prism increases, the sum of the pupil areas always remaining large. Consequently, a large quantity of light is retroreflected continuously with the angle of incidence of the light into the triple prism arrangement.

In addition, because of the parallel alignment of the edge lines of the pupil areas of neighboring triple prisms along a relatively large range, the reflected light bundles are situated close to one another in space. For example, this provides a high measuring accuracy in the case of the three-dimensional determination of co-ordinates with the triple prism arrangement, and for automated measurement.

Since interfering reflections can originate from triple prisms that are located laterally to the actual working prism and are not aligned in the direction of the measuring beam, the shading of precisely these adjacent triple prisms makes it possible to reduce the interfering reflections even when the vertical angle deviates from the horizontal plane by more than ±30°.

As outlined above, one aspect is that eight triple prisms are arranged around the arrangement axis in such a way that their contour can be embedded in an octahedral shape, wherein four of the eight triple prisms are arranged to embed in a first pyramidal body and other four of the eight triple prism are arranged to embed in a second pyramidal body. Each of the first and the second pyramidal bodies comprises a pyramid base and four lateral surfaces, wherein the pyramid bases of the first and the second pyramidal bodies are arranged parallel to each other. The shading element is arranged axially between the first and second pyramidal body and ensures that, in the case of oblique light incidence with respect to the arrangement axis, one of the first and second pyramidal body is at least partially shaded by the shading element.

It is also thinkable that retroreflectors, in particular triple prisms, are arranged as reflective elements of a target object for retroreflection of optical radiation along an arrangement axis being configured for retroreflection of light incidence from a direction perpendicular to the arrangement axis, in such a way that a shading element is arranged axially between the retroreflectors. The shading element is configured to be radially larger than the first and the second retroreflector in the direction perpendicular to the arrangement axis, distancing itself from the arrangement axis, which ensures that, in the case of oblique light incidence with respect to the arrangement axis, some of the retroreflectors are at least partially shaded by the shading element.

Since only the pupil area of the light entrance surface provides the desired retroreflection, the areas at the corners of the triple prisms are not effective even when the measuring instrument is correctly aligned. However, if these areas are illuminated by a light beam with a large angle to the normal of the light entry surface, interfering reflections may result. To reduce these interfering reflections, it is advantageous to reduce the light entrance surfaces towards the corners of the triple prisms, especially for the corners close to the upper and lower end poles of the support frame. This reduction can be achieved by either covering these corners with an opaque material, e.g. a lacquer or by using so-called truncated corner cube prisms.

In the case of conventional aiming marker arrangements, reflections additionally occur at the spatially separated triple prisms, and this likewise leads to a faulty distance measurement. This is in evidence chiefly in the range of short distances, e.g. distances shorter than 25 m, for which reason it is necessary to keep a minimum distance in the case of such aiming marker arrangements. By contrast therewith, reliable measurement of range is possible even over short distances by means of the prism arrangement according to one aspect, which has reflections situated very closely next to one another.

For holding the triple prisms stable and compact, the target object has a mount or holder. The triple prisms can then be arranged in such a way that no obscuring of the light entry surfaces by the mount occurs. A horizontal angle range of 360° is thus effectively reflective. Triple prisms and mount are advantageously furthermore designed and arranged in such a way that a specifiable vertical angle range, in particular of at least ±45° or more, is reflective.

BRIEF DESCRIPTION OF THE DRAWINGS

The disclosure is illustrated in more detail below, purely by way of example, with reference to working examples shown schematically in the drawing. Identical elements are labelled with the same reference numerals in the figures. The described embodiments are generally not shown true to scale and they are also not to be interpreted as limiting.

DETAILED DESCRIPTION

Figure 1:
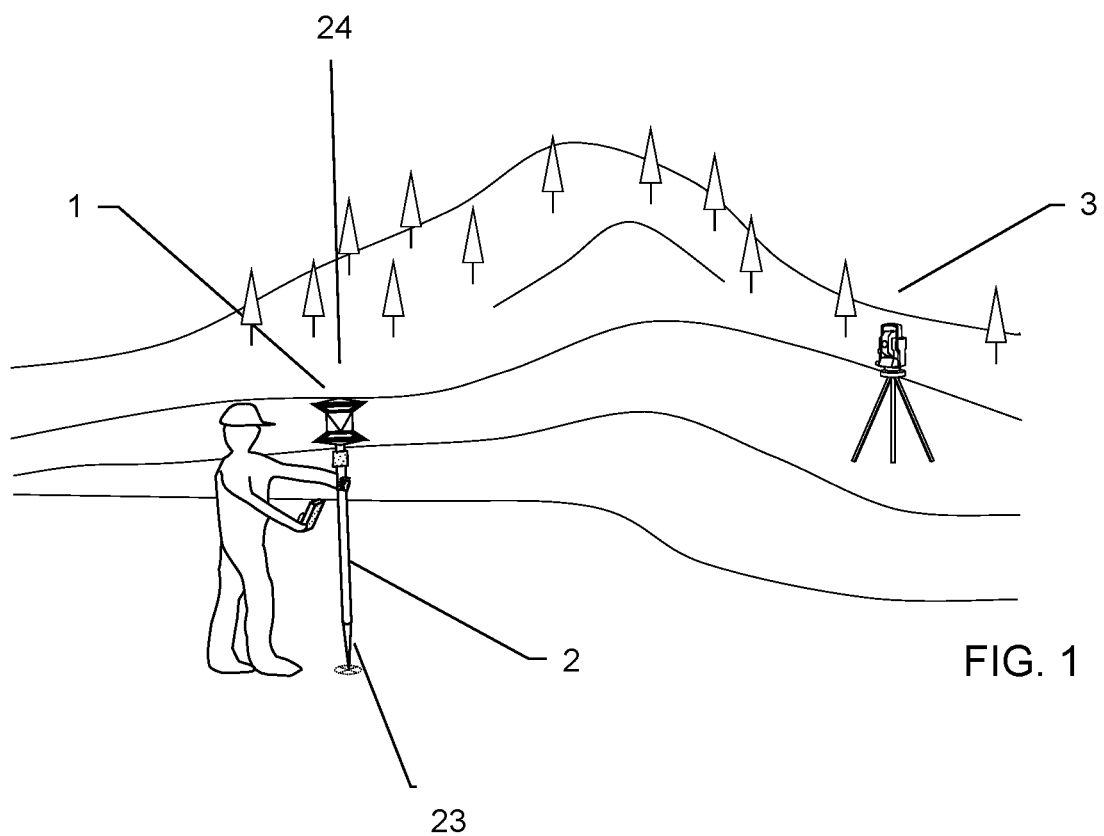
FIG. 1: exemplary staking out workflow using a total station and the target object attached to a pole.

FIG. 1 depicts an exemplary staking out workflow using a total station 3 and a survey pole 2. The survey pole 2 has a rigid, rod-shaped body with a pointer tip 23 for contacting a measuring point on the ground. The body defines a pole axis 24. The pole 2 comprises a target object 1, e.g. retroreflector means, as position giving means for making available the coordinative determination of a referenced position at the pole 2. The target object 1 is positioned on the body at a known position relative to the tip 23. The total station 3 is used for repeatedly determining the referenced position of the target object 1.

The total station 3 comprises a telescope unit that is adapted for measuring a distance and direction angles to the target object 1 of the survey pole 2. The targeting to the retro-reflector means of the pole can be done visually by an optical telescope or by an automatic target recognition sensor unit (ATR) also located inside of the telescope unit of the instrument 3.

In the past the most common position of use of a survey pole 2 was the vertical installation of the pole to determine the horizontal and vertical direction of the target object 1, e.g. the reflector center of a retro-reflector, and thus indirectly also the base of the pole.

In order to simplify the measuring process for the surveyor or civil engineer, new total station—survey pole systems are configured to work with the pole set up at an angle.

By way of example, the survey pole 2 further comprises an inertial measuring unit placed on the body with a defined spatial relationship relative to the position giving means, e.g. wherein the inertial measuring unit is configured in form of a micro-electro-mechanical system (MEMS) and comprises IMU-sensors including accelerometers and gyroscopes. The pole 2 comprises evaluation means for deriving the position of the measuring point at least based on the determined referenced position and on the defined spatial relationship of the target object relative to the tip 23. High-quality poles are equipped with a visual inertial system which calculates the six degrees of freedom of the pole in realtime based information given by a imaging camera and the IMU-sensors.

Often target objects, particularly 360° retroreflectors (360° in the plane perpendicular to the pole axis), have the disadvantage of not marking the target point with sufficient accuracy in situations of oblique beam incidence, i.e. when the pole is tilted. Thus, the accuracy (angle) of the direction determination is not sufficient depending on the alignment of the survey pole and thus the reflector device.

Figure 2:
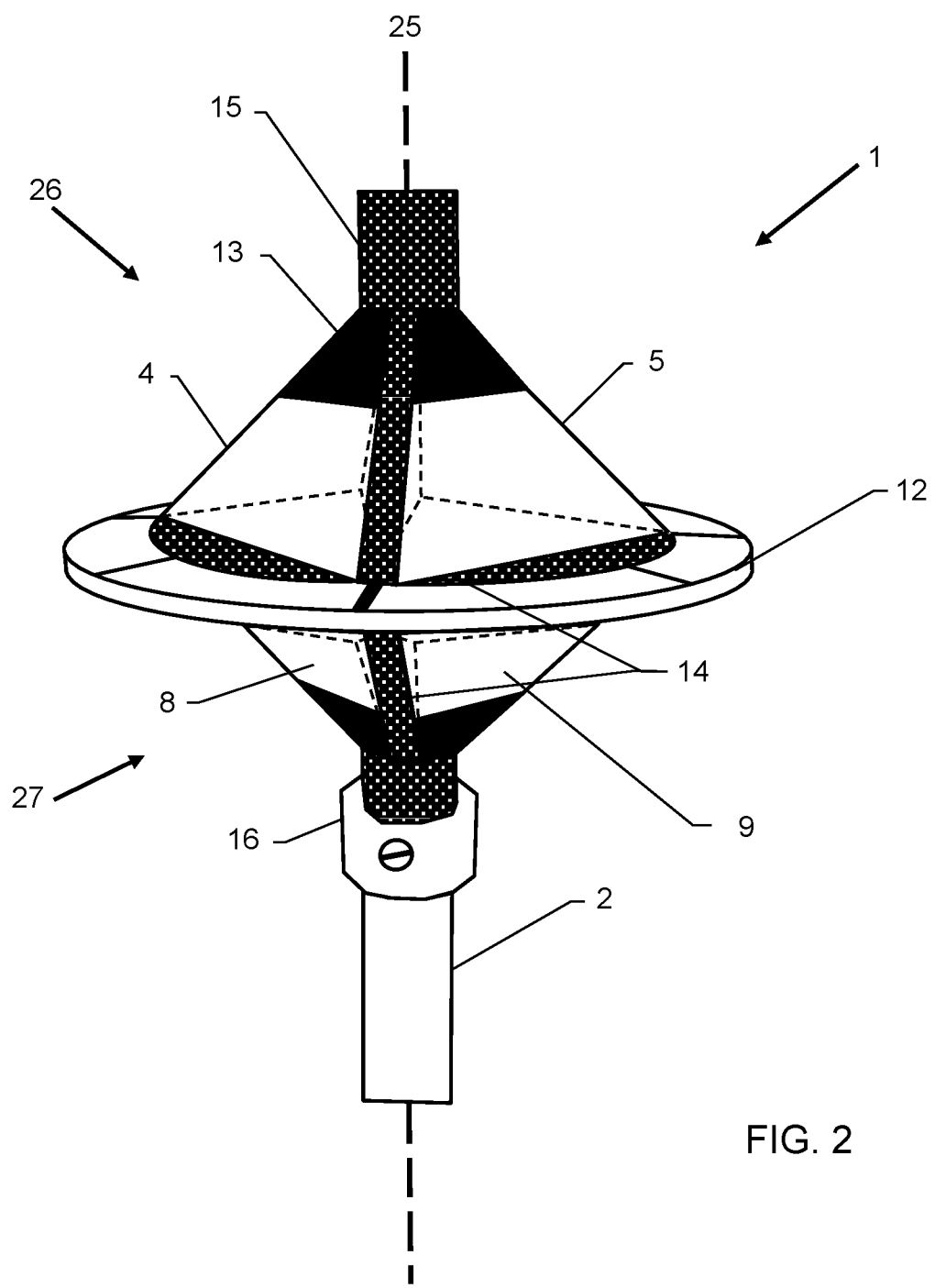
FIG. 2: embodiment of the target object with eight triple prisms arranged in an octahedral shape equipped with shading element, blocking component, support frame and interfaces.

FIG. 2 depicts an exemplary embodiment of the target object 1, here having eight triple prisms 4, 5, 6, 7, 8, 9, 10, 11 of identical design arranged axially adjacent to one another around an arrangement axis 25 and providing an octahedral shape. The arrangement axis 25 passes along the octahedral apices through the octahedral center. The horizontal plane is arranged perpendicular to the arrangement axis 25 and also runs through the octahedral center. The octahedral body results in a way that the four triple prisms 4 to 7 are arranged to embed in a first pyramidal body 26 and four further prisms 8 to 11 are arranged to embed in a further pyramidal body 27. The pyramid bases are arranged parallel to each other lying in the horizontal plane, wherein one of the two pyramidal bodies is formed in such a way that one reflective surface of each of the four triple prisms is aligned parallel to the pyramid base and the respective other two reflective surfaces of each of the four triple prisms are arranged adjacent in each case to one of the reflective surfaces of another of the four triple prisms. The triple prism apices are oriented to the base point of the pyramidal body and the triple prism apices lie in particular in the pyramid base, wherein each light entry surface of the four triple prisms is skew to each reflective surface forming the lateral surfaces of the pyramidal body.

The target object has opaque blocking components 13 arranged in an area around the pyramid tips of the two pyramidal bodies 26, 27. Alternatively, the triple prisms 4, 5, 6, 7, 8, 9, 10, 11 could be configured to have a shape of a truncated pyramid (e.g. see FIG. 5).

By way of example, the target object 1 further has interfaces 15, 16 which are located at the octahedral apices and are arranged axially to the arrangement axis 25 for receiving a counterpart, in particular a surveyor's pole 2. The interfaces are adapted to the shape of the pyramid apices.

Figure 3:
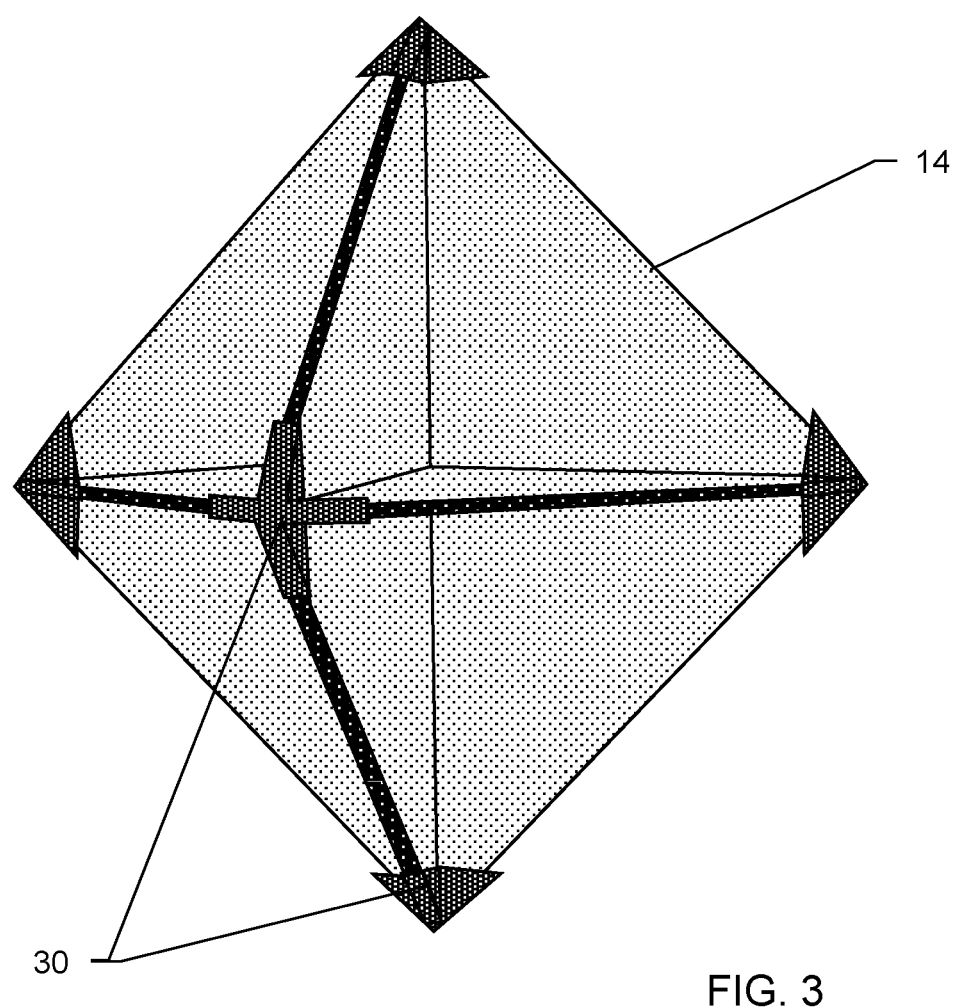
FIG. 3: possible design of the support frame.

The target object 1 also comprises a support frame 14 shown in FIG. 3, comprising of three orthogonal metal sheets whereas the arrangement axis is along the intersecting line of the two vertical metal sheets. The outer edge of the sheets extend up to the light entry surface of the prisms and form a clip mount 30 for the eight triple prisms 4 to 11, with the triple prisms being held in a fixed arrangement by e.g brackets at the end of the sheet walls in such a way that the free aperture of the prisms are not reduzed in size. Also other types of mounting mechanisms are possible for securing the prism position in a stress-free manner.

In other words, the support frame 14 shown in FIG. 3, comprises eight receptions arranged around the arrangement axis 25 in such a way that their contour matches the pyramidal body 26, and the further pyramidal body 27, each of the receptions is delimited by three mutually perpendicular planes, wherein the support frame 14 comprises clip mounts 30 arranged at the corners of the pyramidal body 26 and the further pyramidal body 27 which holds the four triple prisms, and the four further triple prisms, in the receptions in a tension-free and fixed arrangement.

As depicted in FIG. 2, a shading element 12 is arranged axially next to the pyramidal body and the further pyramidal body on side of the pyramid bases. In principle it coincides with the $3^{rd}$ horizontally lying metal sheet. The opaque part of the shading element 12 extends beyond a maximum extension of the four reflective surfaces aligned parallel to the pyramid base distancing itself from the arrangement axis 25, which ensures that, in the case of oblique light incidence with respect to the arrangement axis 25, one of the first and second pyramidal body 26, 27 is at least partially shaded by the shading element 12.

Figure 4:
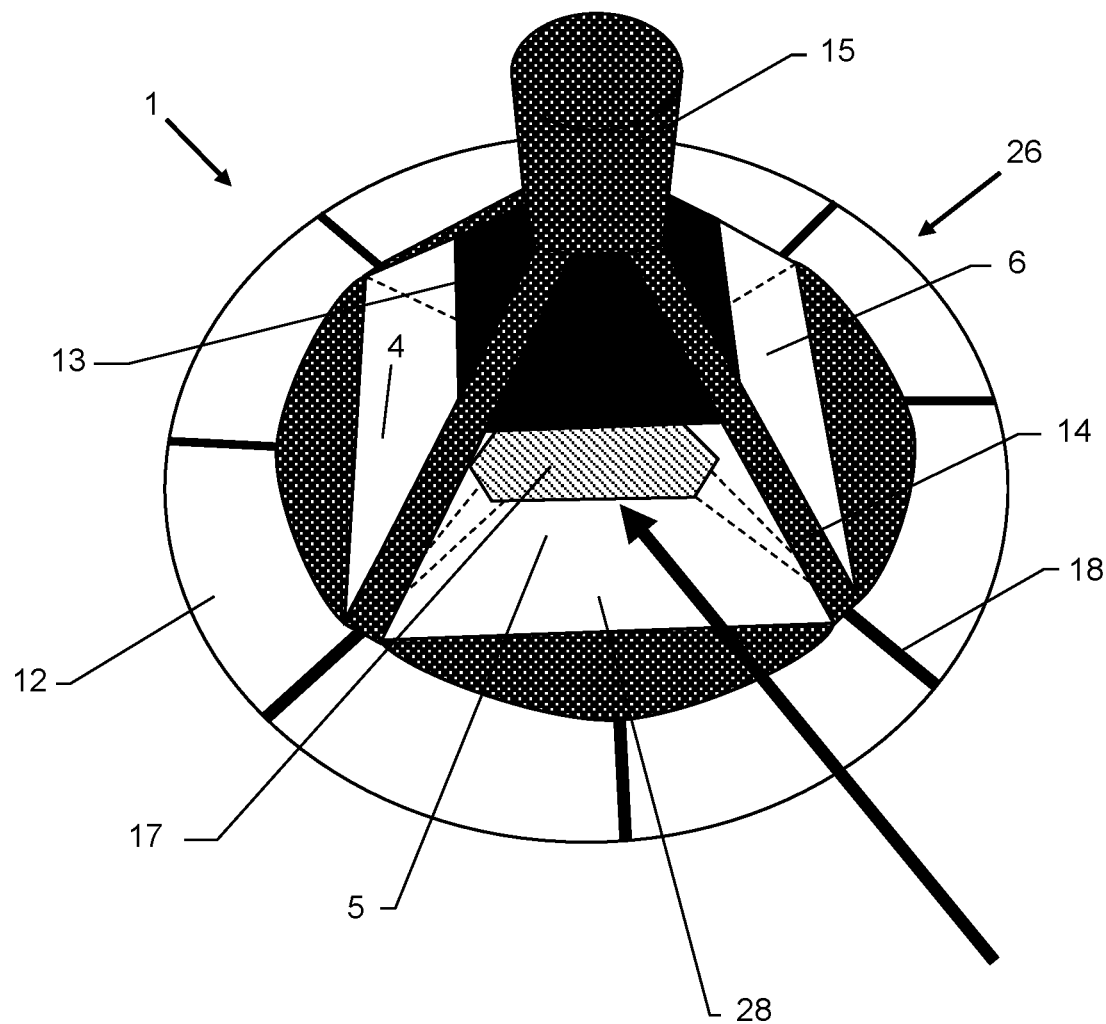
FIG. 4: embodiment of the target object illustrating the area of the light entry surface, which provides retroreflection.

FIG. 4 depicts a further embodiment of a target object 1, wherein the area of the so-called effective light entrance surface 17 of the triple prisms 4 to 11 that provides the desired retroreflection is reduced from the theoretical achievable size. The areas at the corners of the triple prisms 4 to 11 are not effective even when the measuring instrument is correctly aligned, but may provide interfering reflections. Also the triple prism 5 generates interfering reflections for some specific steep incidence angles of the measurement beam.

In order to reduce the mentioned interfering reflections, it is advantageous to reduce the light entrance area towards the pyramid apices, giving the light entrance surface 28 a trapezoidal shape as shown in FIG. 2. This reduction can be achieved by either designing the interfaces 15, 16 in such a way that they cover the pyramid apices to a certain extent or by using so-called truncated corner cube prisms.

Figure 5:
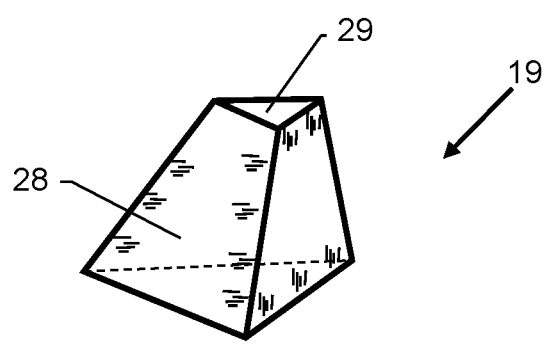
FIG. 5: possible design of a corner cube prism.

FIG. 5 shows a possible embodiment of a so-called truncated corner cube prism 19. It has a further surface 29 that is different from the light entrance surface 28 and the three reflective surfaces. This surface 29 is arranged opposite to the pyramid base, in particular wherein this surface 29 is parallel to the pyramid base. In the case of a pyramidal arrangement of four corner cube prisms around one arrangement axis 25 a shape of a truncated pyramid results.

Since the pyramid apices of the target object 1 shown in FIG. 2 are absent when truncated corner cube prisms are used, the entire arrangement has a reduced weight. In this way, the retroreflective prisms can be increased by 25% in size without increasing the initial weight and size of the target object 1 when using unmodified triple prisms. For example, this leads to a stronger intensity of the retroreflection and thus to an increased measuring distance.

Figure 6:
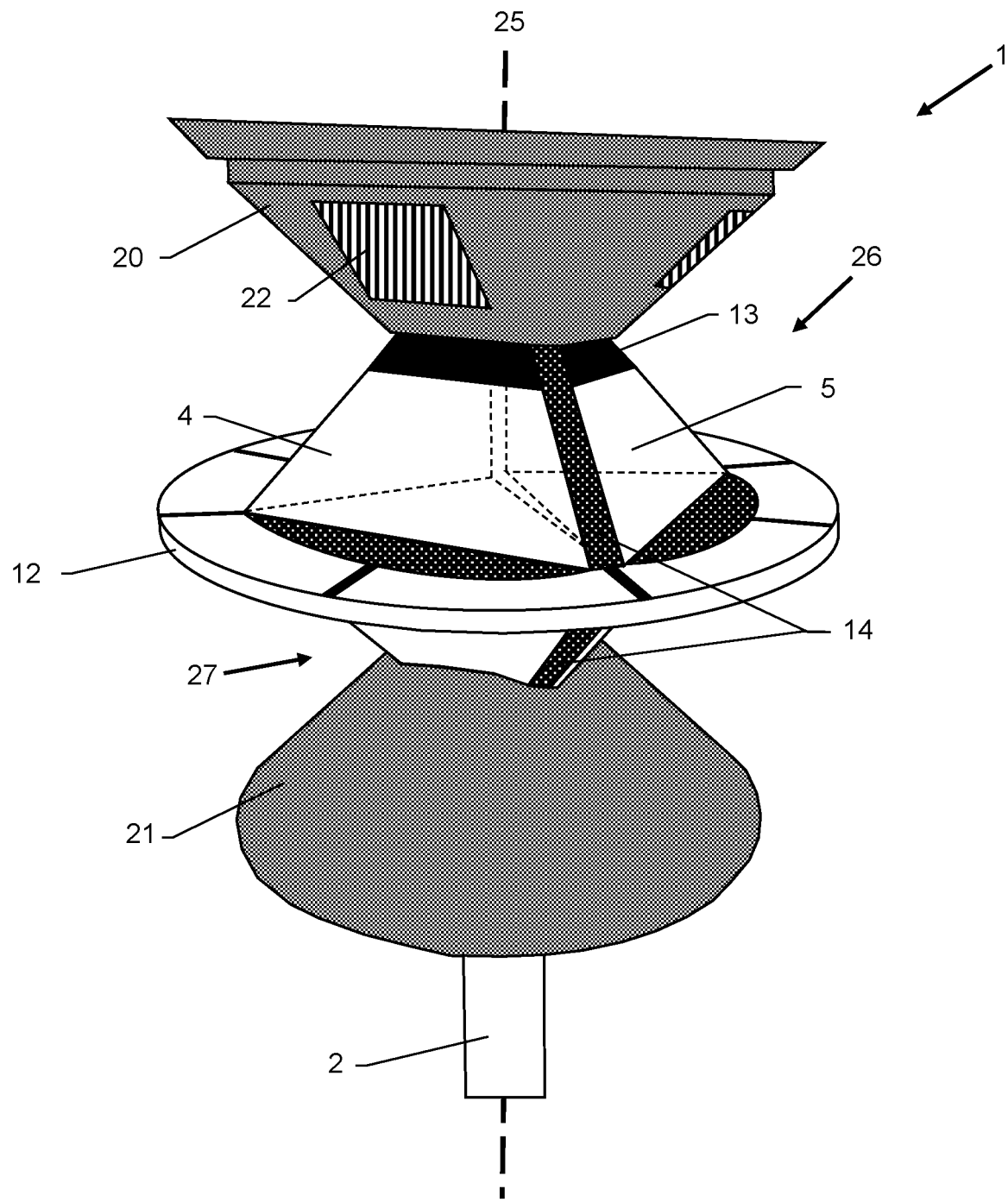
FIG. 6: embodiment of the target object with eight triple prisms arranged in an octahedral shape further equipped with shading element, blocking component, support frame and protective caps.

In a further embodiment, which is shown in FIG. 6, protective caps 20, 21 are attached to interfaces 15, 16 which are intended to ensure a shock-proof mounting of the target object 1. For this purpose, the protective caps 20, 21 are designed in such a way that if an external force or torque acts, for example when the target object 1 falls over, the protective caps 20, 21 are hit first and the force is guided directly to the rod. No force component from outside is guided to the glass prisms unless inertial force for acceleration the mass of the prisms, thus hardly any force is transmitted to the triple prisms 4 to 11.

The protective caps 20, 21 are implemented in an embodiment in which the protective caps 20, 21 have a truncated cone shape, with the top surface of the truncated cone being directed towards the octahedral center and the base of the truncated cone being designed to be radially larger than the reflector arrangement.

Besides the protection against external force, the protective cap 20 also protects the light entry surfaces against water drops which reduce the optically clean prism aperture and/or can lead to interfering reflections. Furthermore, the protective cap 20 is provided with a drainage channel, whereby larger amounts of water, which can accumulate on the protective cap, can be drained off the prism surfaces.

In the embodiment shown in FIG. 6, the protective cap 20, is provided with air intake openings 22 as well as air outlet openings. The air outlet openings being arranged towards the light entry surfaces, in particular parallel to the light entry surfaces. The target object 1 is equipped with pneumatic air nozzles which allow air blasts onto the light entry surfaces. The drying of the surface is particularly efficient by means of pneumatic air nozzles directed parallel to the light entry surfaces. Short pulsed air blasts of 5 mN to 50 mN remove not only large but also small water drops on the light entry surfaces.

In order to facilitate the freeblowing of water drops on the light entry surfaces, these are equipped with a hydrophobic optical coating on the externally directed side. The hydrophobic coating shrinks the contact area of water droplets by orders of magnitude such that the adhesion is reduced accordingly and weak air blasts are sufficient to keep the entry surfaces free from water.

By way of example, the shading element 12 further has markings 18 on the upper and lower side. These markings provide a position indication for a reflection center defined by one of the triple prisms. Marking signs simplify the visual targeting to an obliquely positioned pole when aiming the total station over the eyepiece of the telescope. In a further embodiment of the shading element 12 is made of rubber, which provides additional protection versus mechanical shocks.

Generally it is advantageous when the structure of the target object 1, e.g. as shown in FIG. 6, is highly point symmetric, which makes it possible to use the target object 1 in an oblique setup in contrast to a vertical set-up that has been commonly used so far. By implementing the inventive aspects it is possible to build a target object 1 that provides 360° all-around retroreflection in the horizontal angle range and at least ±45° in the vertical angle range, with the occurrence of interfering reflections significantly reduced. Furthermore, the target object 1 can be used under rainy or snowy weather conditions, as the light entrance surfaces of the triple prisms 4 to 11 can be kept free of water drops by the protective cap 20, 21 and the active air blast device.

Figure 7:
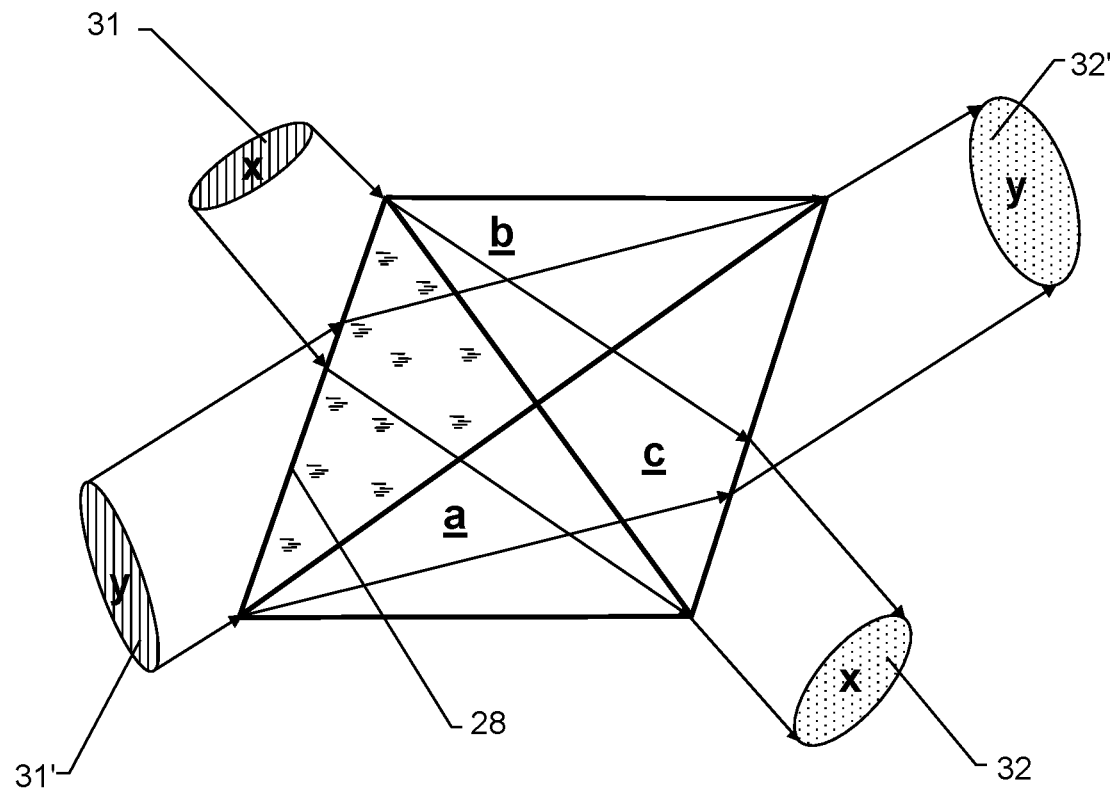
FIG. 7: visualization of effective apertures for two vertical incidence angles.

FIG. 7 shows a so-called unfolded representation of beam paths in a "conventional" triple prism, i.e. with no shading element 12 (FIG. 2) and no blocking component 13 (FIG. 2) at the pyramid tip/no triple prism in the shape of a truncated pyramid 19 (FIG. 5). The unfolded representation allows the optical rays to be drawn as continuous lines without reflection, which makes apertures, vignetting, etc. more visible. With this representation, the paths of light beams hitting the light entry surface 28 of a triple prism in the aperture can be better understood. The areas a, b and c correspond to representations of mirrored images of the prism. Two effective apertures (=borders of rays) for two different incident beams 31, 31' entering the prism of the target object at two selected angles of incidence in elevation direction with corresponding retro-reflected exit beams 32, 32' are depicted.

In variant x, an incident beam 31 enters the prism at a vertical angle of close to 0°, i.e. the incident beam 31 is approximately perpendicular to the arrangement axis 25 (FIG. 2), while in variant y an incident beam 31' enters the prism at a vertical angle of 90°, i.e. the incident beam 31' is parallel to the arrangement axis 25 (e.g. irradiation from zenith or nadir direction when the arrangement axis is vertically oriented).

Figure 8:
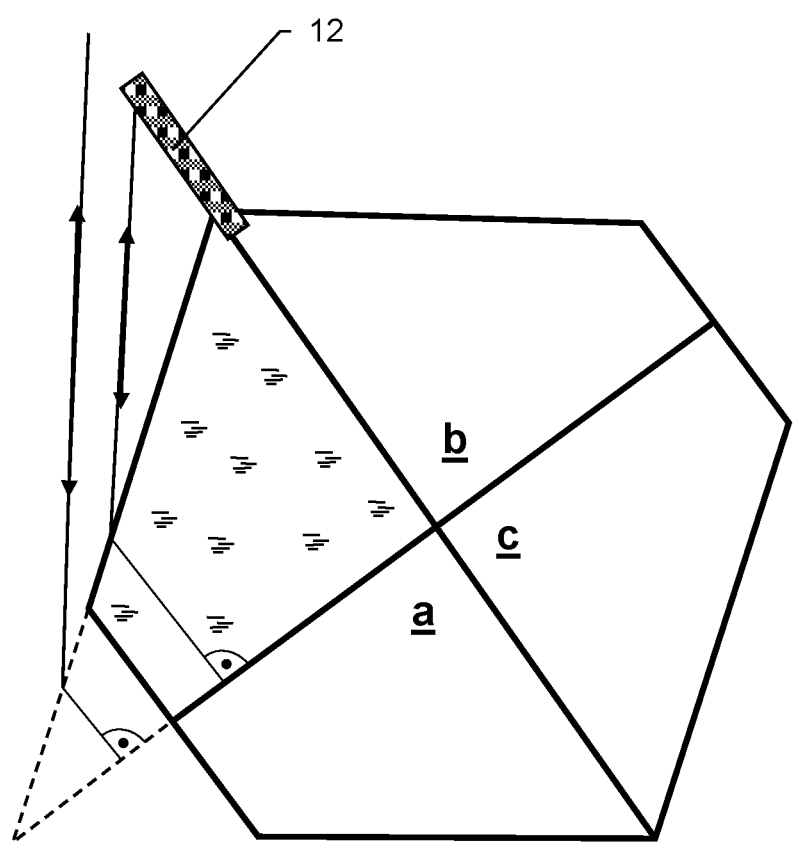
FIG. 8: solution to omit unwanted parasitic or interfering reflections.

FIG. 8 depicts an unfolded representation of a triple prism in a target object according to an embodiment, wherein parasitic signals internal reflections and false retro-reflections that occur in certain beam incidence directions of elevation are suppressed by means of a shading element 12 (FIG. 2) and a blocking component 13 (FIG. 2) at the pyramid tip/a triple prism in the shape of a truncated pyramid 19 (FIG. 5).

By way of example, by removing the so-called far-end prism corner (by means of a blocking component 13 or a triple prism in the shape of a truncated pyramid 19) and the shading element 12 retro-reflected light from steep incidence angles (close to zenith or nadir) is blocked, which would otherwise interfere with retro-reflections from a corresponding prism from the other hemisphere (e.g. a steep beam incidence on a prism of the lower hemisphere is blocked since this beam is better retro-reflected by a prism on the upper hemisphere). In addition, the removed prism corner and the shading element further provide a reduction of interfering reflections (e.g. non triple retro-reflecting reflections).

Although aspects are illustrated above, partly with reference to some preferred embodiments, it must be understood that numerous modifications and combinations of different features of the embodiments can be made. All of these modifications lie within the scope of the appended claims.

The invention claimed is:

1. A target object comprising an arrangement of four triple prisms, each of the triple prisms having a light entry surface and three reflective surfaces, wherein:
   the four triple prisms are arranged around an arrangement axis in such a way that their contour can be embedded in a pyramidal body, which has a pyramid base and four lateral surfaces lying in different planes, wherein a common point of intersection of the planes forms a pyramid tip opposite the pyramid base, and
   for each of the four triple prisms one of its reflective surfaces is aligned parallel to the pyramid base and each of its other two reflective surfaces is aligned parallel to a reflective surface of a respective adjacent triple prism,
   the target object comprises a shading element, which is arranged axially on side of the pyramid base, wherein, in a direction perpendicular to the arrangement axis, an opaque part of the shading element extends beyond a maximum extension of the four reflective surfaces aligned parallel to the pyramid base, wherein either:
   the target object comprises an opaque blocking component arranged in an area around the pyramid tip, wherein the blocking component blocks light from passing the light entry surfaces of the triple prisms, thereby reducing an effectively available size of the light entry surface of each of the triple prisms, or
   each of the triple prisms is configured to have a further prism surface which is different from the light entry surface and the three reflective surfaces, wherein the further prism surfaces are arranged opposite the pyramid base.

2. The target object according to claim 1, wherein the triple prisms are configured in such a way that a distance between a reflection center and the triple prism apexes is not greater than 5 mm.

3. The target object according to claim 2, wherein
   the target object comprises four further triple prisms each of the four further triple prisms having a light entry surface and three reflective surfaces,
   the four further triple prisms are arranged around the arrangement axis in such a way that their contour can be embedded in a further pyramidal body, which has a further pyramid base and four further lateral surfaces lying in different planes, wherein a common intersection of the planes forms a further pyramid tip opposite the further pyramid base,
   for each of the four further triple prisms one of its reflective surfaces is aligned parallel to the further pyramid base and each of its other two reflective surfaces is aligned parallel to a reflective surface of a respective adjacent triple prism, and
   the four and the further four triple prisms are arranged in such a way that their contour can be embedded in an octahedral shape, wherein the pyramid base and the further pyramid base are arranged parallel to each other.

4. The target object according to claim 1, wherein
   the target object comprises four further triple prisms each of the four further triple prisms having a light entry surface and three reflective surfaces,
   the four further triple prisms are arranged around the arrangement axis in such a way that their contour can be embedded in a further pyramidal body, which has a further pyramid base and four further lateral surfaces lying in different planes, wherein a common intersection of the planes forms a further pyramid tip opposite the further pyramid base,
   for each of the four further triple prisms one of its reflective surfaces is aligned parallel to the further pyramid base and each of its other two reflective surfaces is aligned parallel to a reflective surface of a respective adjacent triple prism, and
   the four and the further four triple prisms are arranged in such a way that their contour can be embedded in an octahedral shape, wherein the pyramid base and the further pyramid base are arranged parallel to each other.

5. The target object according to claim 1, wherein the shading element comprises markings arranged on the opaque part of the shading element, wherein the markings provide a position indication for a reflection center of one of the triple prisms.

6. The target object according to claim 1, wherein the shading element, encircles the arrangement axis.

7. The target object according to claim 1, wherein the opaque blocking component or the triple prisms are configured to provide each light entry surface of the triple prisms in a trapezoidal shape.

8. The target object according to claim 1, wherein the target object comprises a support frame, wherein the support frame comprises four or eight receptions arranged around the arrangement axis in such a way that their contour matches the pyramidal body or a further pyramidal body, wherein each of the receptions is delimited by three mutually perpendicular planes, wherein the support frame comprises clip mounts arranged at the corners of the pyramidal body or the further pyramidal body which are configured to hold the four triple prisms or four further triple prisms in the receptions in a tension-free and fixed arrangement.

9. The target object according to claim 8, wherein the receptions are delimited by three mutually perpendicular solid plates.

10. The target object according to claim 1, wherein the target object comprises an interface, located at one of the distal ends on the arrangement axis and configured for connecting the target object to a counterpart.

11. The target object according to claim 10, wherein the target object comprises a protective cap arranged at the one of the distal ends and configured for protecting the target object against axial impinging water drops, wherein the protective cap comprises a drainage channel, wherein a cross-section perpendicular to the arrangement axis narrows from the one of the distal ends to the other distal end and a maximum cross-section perpendicular to the arrangement axis is larger than a radial extension of the triple prisms.

12. The target object according to claim 11, wherein the protective cap has air intake openings as well as air outlet openings, with the air outlet openings being arranged from the one of the distal ends towards the other distal end, and the target object having pneumatic air nozzles, configured to generate air blasts onto the light entry surfaces.

13. The target object according to claim 12, wherein the protective cap has an adapter for an automated target identificator.

14. The target object according to claim 11, wherein the protective cap has an adapter for at least one of a GNSS antenna or a visual inertial system accessory.

15. The target object according to claim 1, wherein the light entry surfaces are equipped with a hydrophobic optical coating.

16. The target object according to claim 15, wherein the protective cap has an adapter for at least one of a GNSS antenna or a visual inertial system accessory.

17. The target object according to claim 16, wherein the protective cap has an adapter for an automated target identificator.

18. The target object according to claim 17, wherein the protective cap has a target identificator, configured to provide target object information regarding a prism type of the target object or a target ID.

19. The target object according to claim 15, wherein the protective cap has a target identificator, configured to provide target object information regarding a prism type of the target object or a target ID.

* * * * *